(12) United States Patent
Murr

(10) Patent No.: US 11,199,037 B1
(45) Date of Patent: Dec. 14, 2021

(54) LIMITER FOR CAR DOOR CLOSING MOVEMENT

(71) Applicant: Derek Orion Murr, Raleigh, NC (US)

(72) Inventor: Derek Orion Murr, Raleigh, NC (US)

(*) Notice: Subject to any disclaimer, the term of this patent is extended or adjusted under 35 U.S.C. 154(b) by 0 days.

(21) Appl. No.: 17/369,885

(22) Filed: Jul. 7, 2021

(51) Int. Cl.
| | |
|---|---|
| *E05F 5/02* | (2006.01) |
| *E05F 3/12* | (2006.01) |
| *E05F 3/04* | (2006.01) |
| *B60J 9/00* | (2006.01) |

(52) U.S. Cl.
CPC ............ *E05F 5/025* (2013.01); *E05F 3/04* (2013.01); *E05F 3/12* (2013.01); *B60J 9/00* (2013.01)

(58) Field of Classification Search
CPC ....... B60J 5/04; E05F 3/04; E05F 3/12; E05F 5/02; E05F 5/025; E05F 5/10
USPC .......................................... 296/146.9, 146.11
See application file for complete search history.

(56) References Cited

U.S. PATENT DOCUMENTS

| | | | |
|---|---|---|---|
| 3,989,287 | A | 11/1976 | Sheesley |
| 8,020,918 | B2 | 9/2011 | Patzer et al. |
| 8,875,344 | B2 | 11/2014 | Salutzki et al. |
| 9,080,363 | B2 | 7/2015 | Reed et al. |
| 9,187,942 | B2 | 11/2015 | Wildforster |
| 9,676,256 | B2 | 6/2017 | Elie et al. |
| 9,714,534 | B1 | 7/2017 | DeGott et al. |
| 9,879,465 | B2 | 1/2018 | Elie et al. |
| 10,267,075 | B2 | 4/2019 | Kenyon et al. |
| 10,344,519 | B2 | 7/2019 | Linden et al. |
| 10,392,849 | B2 | 8/2019 | Xiao et al. |
| 10,626,657 | B2 | 4/2020 | Elie et al. |
| 10,794,103 | B2 * | 10/2020 | Battlogg ................. E05C 17/22 |
| 10,801,246 | B2 | 10/2020 | Elie et al. |
| 2013/0000203 | A1 | 1/2013 | Platt |
| 2016/0215552 | A1 * | 7/2016 | Lohken ................... F16F 9/512 |
| 2017/0159341 | A1 | 6/2017 | Cho |
| 2018/0202212 | A1 * | 7/2018 | Xiao ........................ E05F 3/00 |

FOREIGN PATENT DOCUMENTS

| | | | |
|---|---|---|---|
| CN | 201714216 U | | 1/2011 |
| CN | 212454073 U | * | 2/2021 |
| CN | 212454073 U | | 2/2021 |
| DE | 102011008420 A1 | | 7/2012 |
| DE | 102015000514 A1 | | 7/2016 |
| DE | 102016210168 B3 * | 4/2017 | .............. E05F 15/00 |

(Continued)

*Primary Examiner* — Jason S Daniels
(74) *Attorney, Agent, or Firm* — Kevin E Flynn; Flynn IP Law

(57) ABSTRACT

A method and device for reducing excessive door or hatch closing velocity. An actuator containing a force alignment channel causes piston movement within a hydraulic cylinder creating resistance to prevent door or hatch slamming. Closing of the car door is against the resistance of the hydraulic cylinder as hydraulic fluid moves through at least one channel to allow hydraulic fluid to move from a first side of the piston to a second side of a piston. The resistance of the hydraulic cylinder to an incremental movement in the car door varies during the closing of the car door. A force alignment channel within an actuator creates variation of the resistance of the hydraulic cylinder to the incremental movement in the car door by varying a rate of movement of the piston within the hydraulic cylinder per degree of closure of the car door.

23 Claims, 11 Drawing Sheets

(56) References Cited

FOREIGN PATENT DOCUMENTS

| | | | |
|---|---|---|---|
| GB | 2561681 A | | 10/2018 |
| KR | 20020076767 A | | 10/2002 |
| KR | 20030010068 A | | 2/2003 |
| KR | 20030016849 A | | 3/2003 |
| KR | 100482681 B1 | | 4/2005 |
| KR | 100527142 B1 | | 11/2005 |
| KR | 20150011124 A | | 1/2015 |
| KR | 101866043 B1 | | 6/2018 |
| KR | 20180113098 A | * | 10/2018 |
| KR | 102041116 B1 | | 11/2019 |

* cited by examiner

100

100

100

100

LIMITER FOR CAR DOOR CLOSING MOVEMENT

BACKGROUND

Field of the Disclosure

This disclosure relates generally to equipment for automotive doors and trunks or rear hatches. More particularly, the present disclosure describes a limiter assembly for use in limiting the rate at which a car door may close. This may be used to reduce the ability of a user to slam a door. The limiter may be used beyond automotive doors and may be used to limit the angular velocity of one component relative to another component that is connected by one or more hinges.

Vocabulary

Or.

Unless explicit to the contrary, the word "or" should be interpreted as an inclusive or rather than an exclusive or. Thus, the default meaning of or should be the same as the more awkward and/or.

Set.

Unless explicit to the contrary, the word "set" should be interpreted as a group of one or more items.

Gne and Gnes.

To avoid the awkward he/she and his/her or the potentially confusing singular use of they and their, this application uses the gender-neutral pronoun gne and the possessive gnes.

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process it is useful to note that a given parameter is substantially met. Examples may be substantially parallel, substantially perpendicular, substantially uniform, and substantially flat. In this context, substantially X means that for purposes of this industrial process it is X. So something that may not be absolutely parallel but is for all practical purposes parallel, is substantially parallel. Likewise, mixed air that has substantially uniform temperature would have temperature deviations that were inconsequential for that industrial process.

As recognized in *C. E. Equipment Co.* v. *United States*, 13 U.S.P.Q.2d 1363, 1368 (Cl. Ct. 1989), the word "substantially" in patent claims gives rise to some definitional leeway—thus the word "substantially" may prevent avoidance of infringement by minor changes that do not affect the results sought to be accomplished.

Excessive Rate of Closure—Slamming.

For the purpose of this disclosure and the claims that follow, an excessive door closing rate is at least 5 rpm. As a car door only travels a fraction of a revolution, it may be more intuitive to convert 5 rpm to at least 30 degrees of closure/second.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Some aspects of the teachings of the present disclosure may be expressed as a limiter assembly for use during a closing of a car door. The limiter assembly also includes an actuator with a force alignment channel; the actuator connected to a door pillar so that the actuator does not move during closing of the car door; a hydraulic cylinder located within the car door may include: a piston that moves within the hydraulic cylinder during opening of the car door and during closing of the car door, a rod connected at a first end to the piston within the hydraulic cylinder, the rod extending out of a first end of the hydraulic cylinder and moving with respect to the first end of the hydraulic cylinder during opening of the car door and during closing of the car door, the rod slidably connected to the force alignment channel via a force reflector pin. The assembly also includes the force alignment channel configured to keep the rod substantially perpendicular to a set of tangents of the force alignment channel taken at a current point of contact of the force reflector pin and the force alignment channel during closing of the car door; and the limiter assembly providing resistance to changes in the door angle proportional to a rate of change of position of the piston within the hydraulic cylinder per degree of change in the door angle of the car door moving towards fully closed.

Some implementations may use a limiter assembly where the force reflector pin is encased in a sleeve that makes contact with the force alignment channel.

Some implementations may be set so that a first distance of travel of the piston for a first half of movement of the car door from the fully open position to the fully closed position exceeds a second distance of travel of the piston for a second half of movement of the car door from the fully open position to the fully closed position so that the resistance to changes in the door angle from the hydraulic cylinder is less on the second half of movement of the car door from the fully open position to the fully closed position than on the first half of movement of the car door from the fully open position to the fully closed position so as to promote complete closure of the car door.

Some implementations may be set so that the hydraulic cylinder has at least one bidirectional channel that allows hydraulic fluid to pass from a rod side of the hydraulic cylinder to a cap end of the hydraulic cylinder and allows hydraulic fluid to pass from the cap end of the hydraulic cylinder to the rod side of the hydraulic cylinder, and at least one unidirectional channel that allows hydraulic fluid to pass from the rod side of the hydraulic cylinder to the cap end of the hydraulic cylinder but does not freely allow hydraulic fluid to pass from the cap end of the hydraulic cylinder to the rod side of the hydraulic cylinder as a check valve impedes movement in one direction, where the resistance to movement of the piston within the hydraulic cylinder is less when the car door moves to fully open from the fully closed position than the resistance to movement of the piston when the hydraulic cylinder moves from the fully open position to the fully closed position.

Some implementations may be set so that at least one bidirectional channel traverses the piston from a rod side of the hydraulic cylinder to the cap end of the hydraulic cylinder.

Some implementations may be set so that at least one unidirectional channel traverses the piston from a rod side of the hydraulic cylinder to the cap end of the hydraulic cylinder. The car door rotates around a hinge pin and the hinge pin is substantially vertical when the car is on a level foundation. The car door rotates around a hinge pin and the hinge pin is substantially horizontal when the car is on a level foundation.

Some aspects of the teachings of the present disclosure may be expressed as a limiter assembly for use during a closing of a car door; a hinge connecting a set of two door hinge sides may include: a pillar side that does not move when the car door moves from fully open to fully closed, a car door side of the hinge that does move when the car door moves from fully open to fully closed. The assembly also includes an actuator with a force alignment channel; the actuator connected to one of the two door hinge sides; a hydraulic cylinder located within the other of the two door hinge sides: a piston that moves within the hydraulic cylinder during opening of the car door and during closing of the car door, a rod connected at a first end to the piston within the hydraulic cylinder, the rod extending out of a first end of the hydraulic cylinder and moving with respect to the first end of the hydraulic cylinder during opening of the car door and during closing of the car door, the rod slidably connected to the force alignment channel via a force reflector pin. The assembly also includes the force alignment channel configured to keep the rod substantially perpendicular to a set of tangents of the force alignment channel taken at a current point of contact of the force reflector pin and the force alignment channel during closing of the car door; and the limiter assembly providing resistance to changes in the door angle proportional to a rate of change of position of the piston within the hydraulic cylinder per degree of change in the door angle of the car door moving towards fully closed.

Some aspects of the teachings of the present disclosure may be expressed as a method of opening and closing a car door. The method of opening also includes opening a car door having a first side of a door hinge and a second side of a door hinge; where opening the car door from a fully closed position to a fully open position includes moving a piston within a hydraulic cylinder as one end of a rod is connected to the first side of the door hinge and the other end of the rod is connected to the piston within the hydraulic cylinder on the second side of the door hinge. The opening also includes closing the car door against the resistance of the hydraulic cylinder as hydraulic fluid moves through at least one channel to allow hydraulic fluid to move from a first side of the piston to a second side of a piston; the resistance of the hydraulic cylinder to an incremental movement in the car door varying during the closing of the car door. The opening also includes a shape of a force alignment channel within an actuator on the first side of the door hinge creating a pattern of variation of the resistance of the hydraulic cylinder to incremental movement in the car door as the shape of the force alignment channel varies the movement of the piston within the hydraulic cylinder per degree of closure of the car door.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
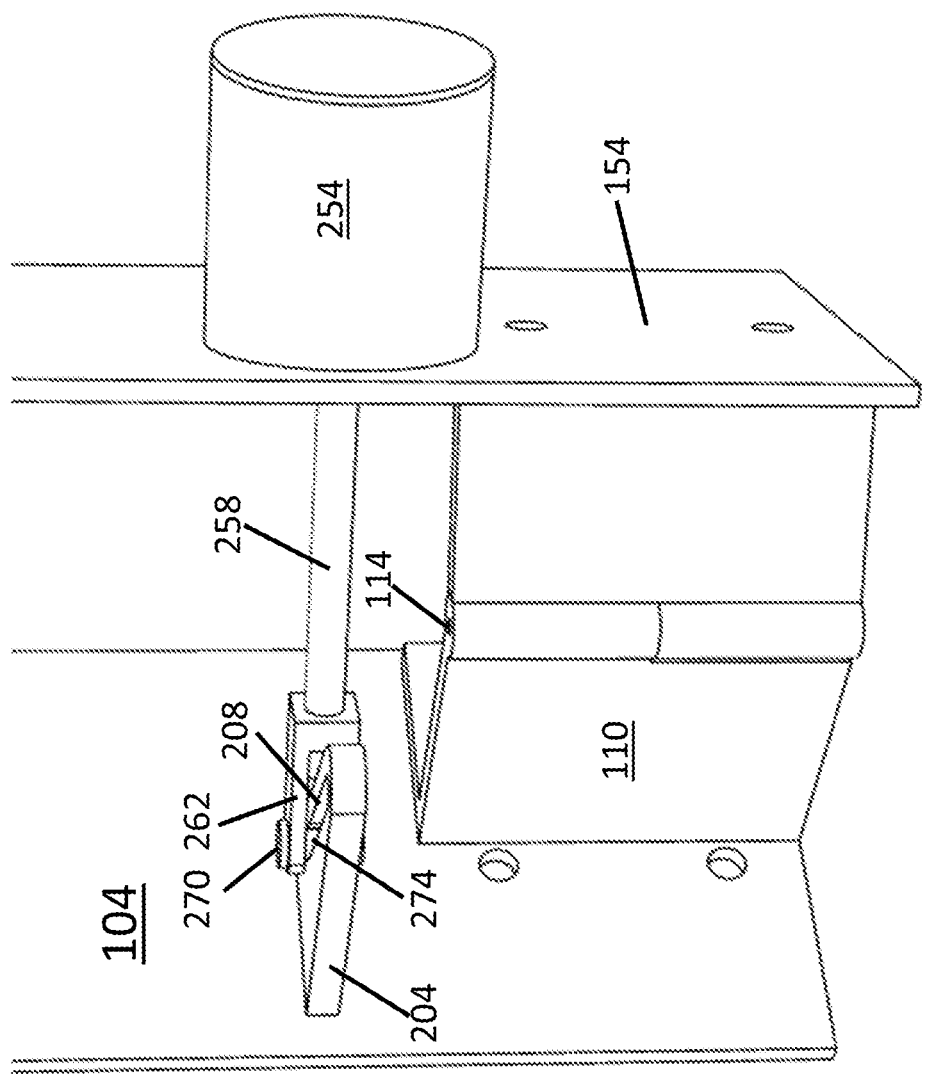
FIG. 1 introduces a hinged car door with the door fully open.

FIG. 1 introduces a hinged car door. Pillar plate 104 is connected to a fixed portion of the car frame. Door plate 154 is connected to a car door. Pillar plate 104 and door plate 154 are connected by a hinge 110 with hinge pin 114. Hinge pin 114 is substantially vertical. The car door and door plate 154 rotate relative to hinge pin 114 to open and close the car door. FIG. 1 shows the door fully open. In this case, fully open is rotated 64 degrees from fully closed which is defined as 0 degrees open. Those of skill in the art will appreciate that not all car doors are fully open at 64 degrees and this disclosure is not limited to that particular characteristic.

Mounted on the pillar plate 104 is an actuator 204 with a force alignment channel 208. Those of skill in the art will appreciate that while both the hinge 110 and the actuator 204 must be connected to the fixed pillar, the two components may be connected to the pillar in different ways and do not both have to be connected to the pillar plate 104.

Within the car door, there is a hydraulic cylinder 254 that includes a piston 260 (not visible here) and a piston rod 258 connected to a first end of the piston 260 and to the actuator 204. The connection to the actuator 204 may be made through use of a U-shaped yoke 262 and a force reflector pin 270. The force reflector pin 270 may be encased in a cylindrical sleeve 274 which is the actual point of contact with the force alignment channel 208. The interior of the cylindrical sleeve 274 may be lubricated so that the cylindrical sleeve 274 may move relative to the force reflector pin 270 through a rotational motion. The exterior of the cylindrical sleeve 274 may be lubricated so that the cylindrical sleeve 274 moves relative to the force alignment channel 208 through a combination of sliding and rolling.

During opening of the door, the cylindrical sleeve 274 will be in contact with the door-side of the force alignment channel 208. Conversely, during the closing of the door, the cylindrical sleeve 274 will be in contact with the pillar-side of the force alignment channel 208.

Optional Asymmetric Resistance.

Figure 2:
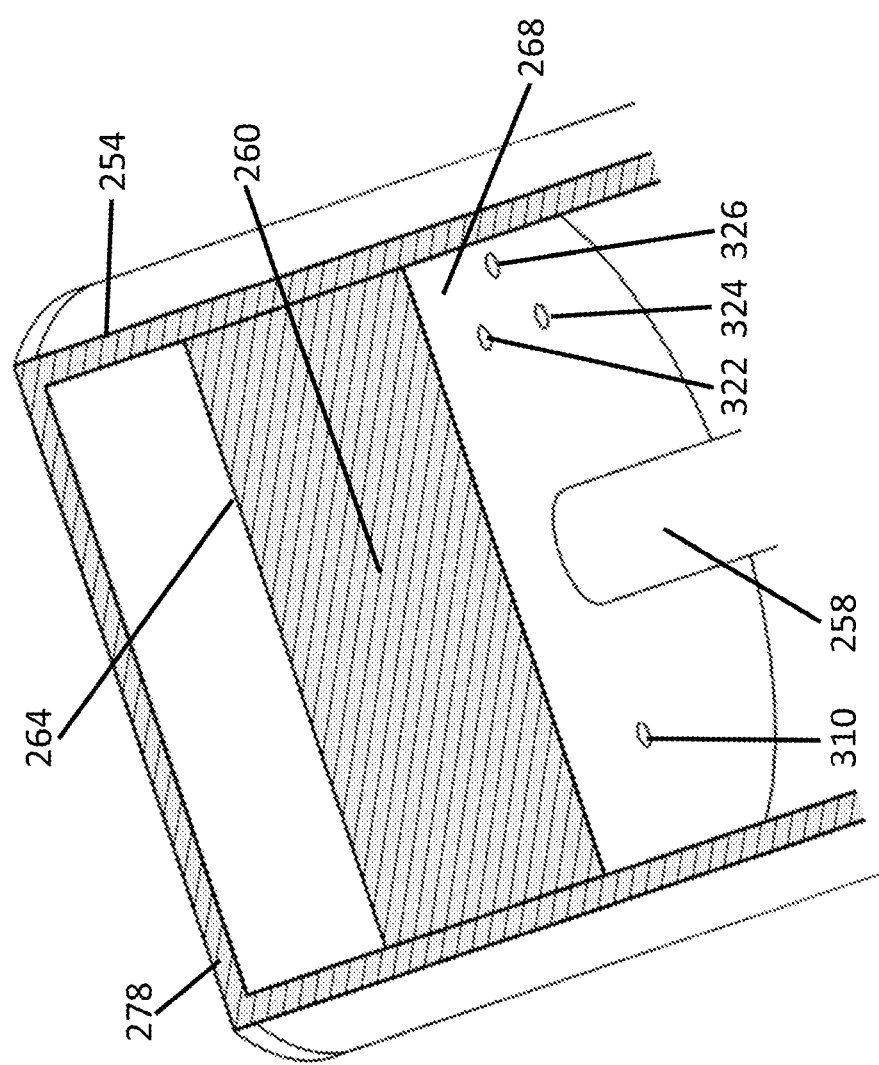
FIG. 2 shows a cross section of the hydraulic cylinder 254 rotated to show a portion of the rod end 268 of piston 260 facing away from the cap end 278 of the hydraulic cylinder 254.
Figure 3:
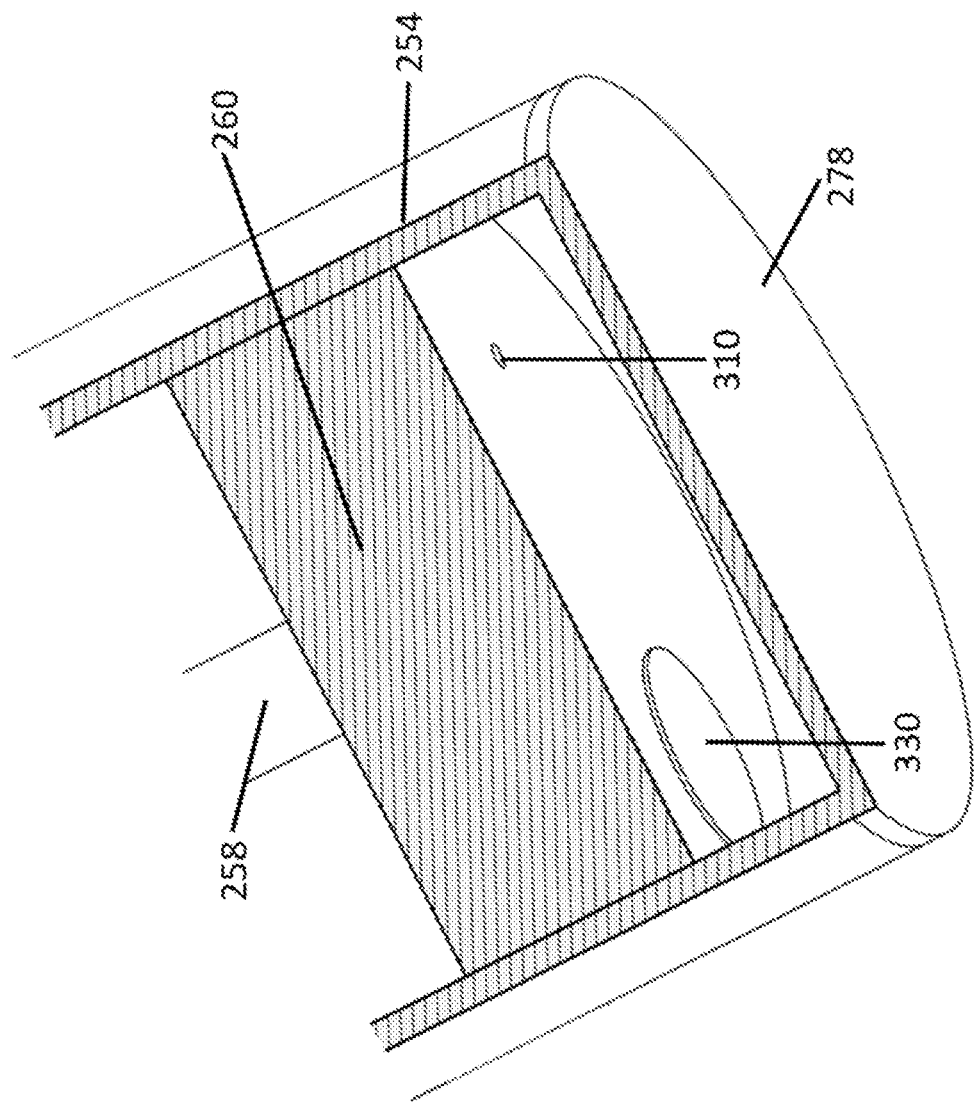
FIG. 3 shows a cross section of the hydraulic cylinder 254 rotated to show a portion of the piston head 264 of the piston 260 facing the cap end 278 of the hydraulic cylinder 254.

FIG. 2 shows a cross section of the hydraulic cylinder 254 rotated to show a portion of the rod end 268 of piston 260 facing away from the cap end 278 of the hydraulic cylinder 254. Conversely, FIG. 3 shows a cross section of the hydraulic cylinder 254 rotated to show a portion of the piston head 264 of the piston 260 facing the cap end 278 of the hydraulic cylinder 254.

A set of channels (310, 322, 324, and 326) traverses the piston 260 to allow hydraulic fluid to flow from one side of the piston 260 to the other side of the piston 260 to facilitate movement of the piston 260 within the hydraulic cylinder 254 during opening motion of the door. These channels (310, 322, 324, and 326) allow sufficient fluid to traverse the piston at any rate of door opening speed.

An umbrella valve 330 covers a portion of the piston head 264 of the piston 260. The umbrella valve covers the unidirectional channels 322, 324, and 326 when the piston 260 is moving towards the cap end 278. As the piston 260 moves towards the cap end 278 as the door is closing, the only hydraulic fluid moving through the channels in the piston 260 is the hydraulic fluid moving through channel 310 which may be called a bidirectional channel 310. When the shearing forces of the hydraulic fluid passing through the bidirectional channel 310 in the piston 260 are great enough due to an excessive door closing rate, these shearing forces slow the closing rate of the door to resist a door slam. Conversely, at a reasonable rate of door closure, these shearing forces do not affect the closing rate of the door. In other words, there is no real impact on a door being closed at a reasonable rate but a mitigating impact to resist a door from traveling at an excessive door closing rate to resist door slams.

When the piston 260 moves towards the rod end 276 (FIG. 5) of the hydraulic cylinder 254 while the car door is opening, the umbrella valve 330 lifts to allow hydraulic fluid to flow through unidirectional channels 322, 324, and 326 in addition to bidirectional channel 310. Thus, the resistance to movement of the piston 260 is much less while the car door is opening versus while the car door is closing.

Those of skill in the art will appreciate that the channels do not all have to be the same size or shape. A rod cross section for the channels may be preferred so that channels may be created by drilling through the piston 260. Round channels may be called ports. More than one umbrella valve 330 may be used with each umbrella valve covering a portion of the piston head 264 and at least one unidirectional channel (322, 324, 326) within the piston 260.

An umbrella valve 330 is a type of check valve. Those of skill in the art are familiar with a range of check valves and can readily substitute one check valve for another one without deviating from the teachings of the present disclosure. The use of one or more check valves can be used to form at least one unidirectional channel that allows hydraulic fluid to pass from the rod end 276 of the hydraulic cylinder 254 to the cap end 278 of the hydraulic cylinder 254 but does not freely allow hydraulic fluid to pass from the cap end of the hydraulic cylinder to the rod end 276 of the hydraulic cylinder as a check valve impedes movement in one direction. Those of skill in the art recognize that not every check valve provides an absolute barrier to flow in the impeded direction. For purposes of the teachings of this application, a check valve that substantially impedes flow in one direction relative to flow in the opposite direction would serve the purpose of altering the response of the system during opening of a car door relative to closing of a car door.

Those of skill in the art will appreciate that the umbrella valve on the unidirectional channels could be replaced by a bypass line (not shown) with a check valve around the piston 260.

While the figures show an asymmetric resistance scheme to provide more resistance while closing the door than opening the door, a designer with a particular need could reverse the bias to reduce the risk of the door being opened too quickly. This might be to reduce the risk of damaging a nearby car, avoiding damage to the door that reaches the full open limit while traveling quickly, or for some other reason.

Likewise, a designer could use bidirectional channels without any check valves to have the same resistance to travel in both directions.

The rotation of the door (represented by door plate 154) around hinge pin 114 is slowed by the piston 260 moving within hydraulic cylinder 254 when the shearing forces of the hydraulic fluid passing through the bidirectional channel 310 in the piston 260 are great enough due to an excessive door closing rate. Conversely, these shearing forces at a reasonable rate of door closure do not affect the closing rate of the door. In other words, the resistance imposed by the movement of the piston 260 within the hydraulic cylinder 254 goes from not significant during normal door closings to very significant to resist a slamming door closing.

Figure 4:
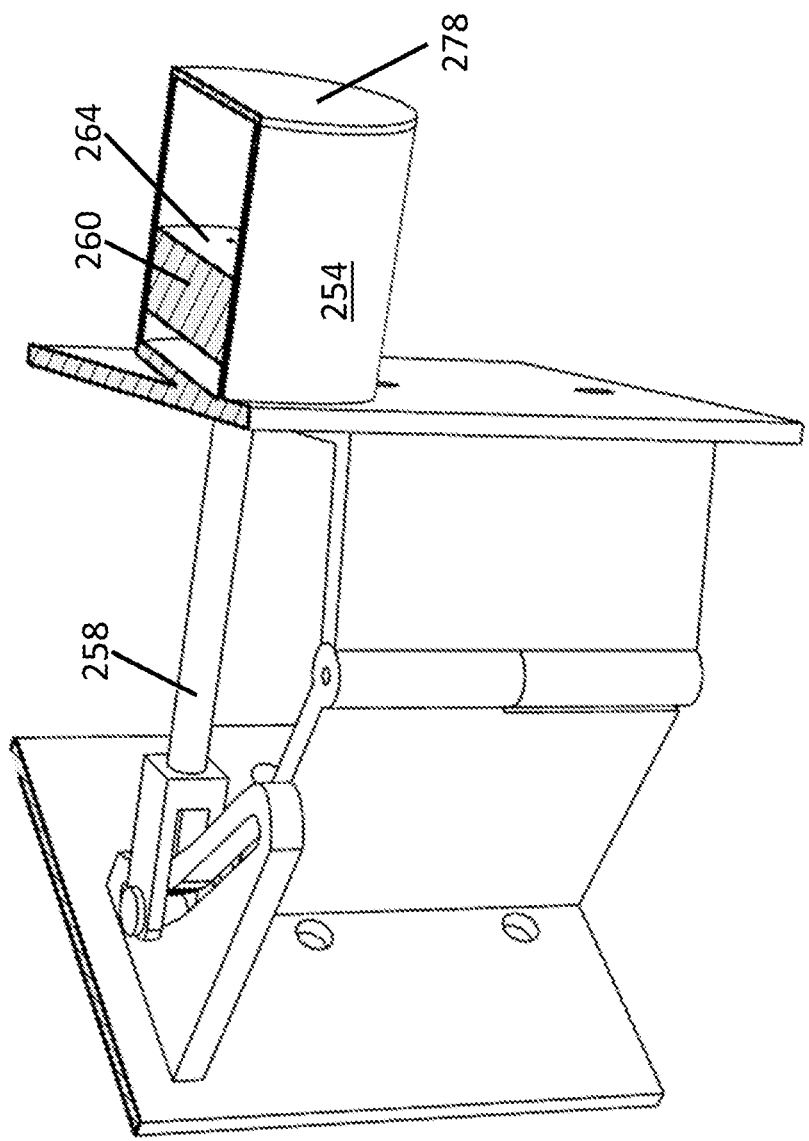
FIG. 4 is the same view of the open car door as shown in FIG. 1 with a cross section taken above the piston rod 258 so that the position of the piston 260 within the hydraulic cylinder 254 is visible.

FIG. 4 is the same view of the open car door as shown in FIG. 1. FIG. 4 differs from FIG. 1 in that a cross section has been taken above the piston rod 258 so that the position of the piston 260 within the hydraulic cylinder 254 is visible. The cap end 278 of the hydraulic cylinder 254 and the piston head 264 of the piston 260 are also identified.

Figure 5:
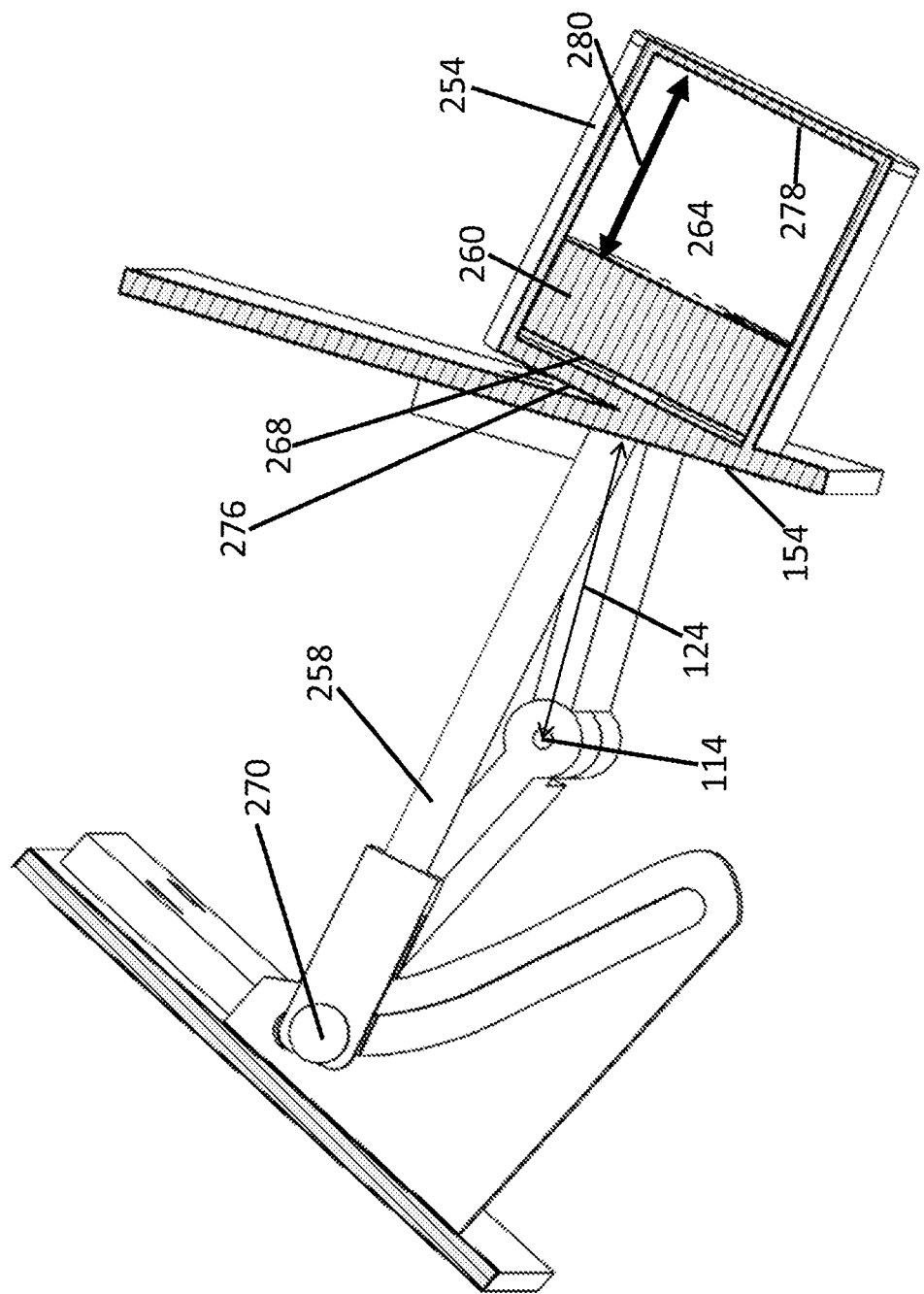
FIG. 5 shows the same open car door from FIG. 4 but in this case the view is substantially aligned with the vertical hinge pin 1 114.

FIG. 5 shows the same open car door from FIG. 4 but in this case the view is substantially aligned with the vertical hinge pin 114. This view can be deemed looking down onto a hinge assembly 110 on the driver side of the car for a car that has the driver on the left side. The the rod end 268 of the piston 260 is close to but not quite touching the rod end 276 of the hydraulic cylinder 254 and thus maximally distant from the opposing cap end 278. As noted above, fully open is rotated 64 degrees from fully closed which is defined as 0 degrees open. Those of skill in the art will appreciate that not all car doors are fully open at 64 degrees and this disclosure is not limited to that particular characteristic.

Note that the force alignment channel 208 is shaped so that the centerline of the piston rod 258 is substantially perpendicular with the tangent of force alignment channel 208 at the point of contact of the cylindrical sleeve 274 around the force reflector pin 270. As seen in the sequence of figures that follows, the shape of the force alignment channel 208 maintains the centerline of the piston rod 258 substantially perpendicular with the tangent of force alignment channel 208 at the point of contact of the cylindrical sleeve 274 around the force reflector pin 270 throughout the closing of the door. This alignment transfers force to the piston 260 to move against the hydraulic resistance within the hydraulic cylinder 254 and thus draw energy from the kinetic energy that would be within the closing door. This alignment limits side loading of the piston rod 258.

The design of the force alignment channel 208 within actuator 204 will be unique for different applications and geometries based on the shape of door hinge 110 and the corresponding shape and weight of the door or hatch. At the risk of over simplifying the process, we can set forth the following:

A designer can create a larger resistance to high-speed door travel at one set of door open angles versus another set of door open angles by changing the relative amount of movement of the piston 260 per degree of change of door open angle during door closure. To provide more resistance to high-speed closure at a certain set of door angles (such as early in the door closing process), the designer can choose to have a relatively high amount of movement of the piston 260 within the hydraulic cylinder 254 per degree change in door angle. Conversely, to provide less resistance to door closure at a different set of door angles (such as late in the door closing process) the designer can choose to have a relatively low amount of movement of the piston 260 within the hydraulic cylinder 254 per degree change in door angle.

These design choices and the geometry of the door and hinge lead to a unique curvature of force alignment channel 208 where the cylindrical sleeve 274 contacts the force alignment channel to produce the appropriate amount of piston 260 travel for that portion of the closing process.

As illustrated in Table 1, the varying radius of force alignment channel 208 measured between force alignment channel 208 and rod end 276 of the hydraulic cylinder 254 from fully open at 64 degrees to fully closed at 0 degrees causes the piston 260 travel rate to decrease throughout the closing process.

The forces opposing excessive door closing rates created by this device are the combined results of the distance of travel of the piston 260, the viscosity of the hydraulic fluid in the hydraulic cylinder 254, and the cross section of the bidirectional channel 310 that is the path for travel of hydraulic fluid through the piston 260. Since the components within the hydraulic cylinder 254 (the bidirectional channel 310 and the hydraulic fluid) are constant throughout the travel of the door from open to closed, the only way to adjust the opposing force to resist excessive door closing rates is through the shape of the force alignment channel.

In designing a force alignment channel 208, the greatest influencers to the shape of the force alignment channel 208 are first the geometry of the door hinge and door where the device will be located, and second the amount of piston 260 travel during increments of door closure. Focusing on the second influencer, a designer could choose (like in Table 1) that within the first 17 increments (out of 34 total increments) that the piston 260 will travel between 0.035" and 0.030" per two-degree door closing increment but then sharply decrease the amount of piston 260 travel over the last 17 increments (thus reducing forces opposing door closure). With those design goals, a force alignment channel 208 can be implemented to actuate the piston rod 258 and piston 260 to get the variation in piston movement per angle of door closure.

While designing each force alignment channel 208 and taking into consideration the known amount of piston 260 per increment of change in door angle as well as the known total starting length of the piston rod 258/yoke 262/force reflector pin 270 and cylindrical sleeve 274, the distance (radius) from rod end 276 of the hydraulic cylinder 254 can be decreased each increment of angle change by the designed amount (the desired amount of piston travel per that increment of door angle change). When enough increments are included, the points represented by the location of the force reflector pin 270 for that increment provide the basis for the shape of the force alignment channel 208.

Figure 6:
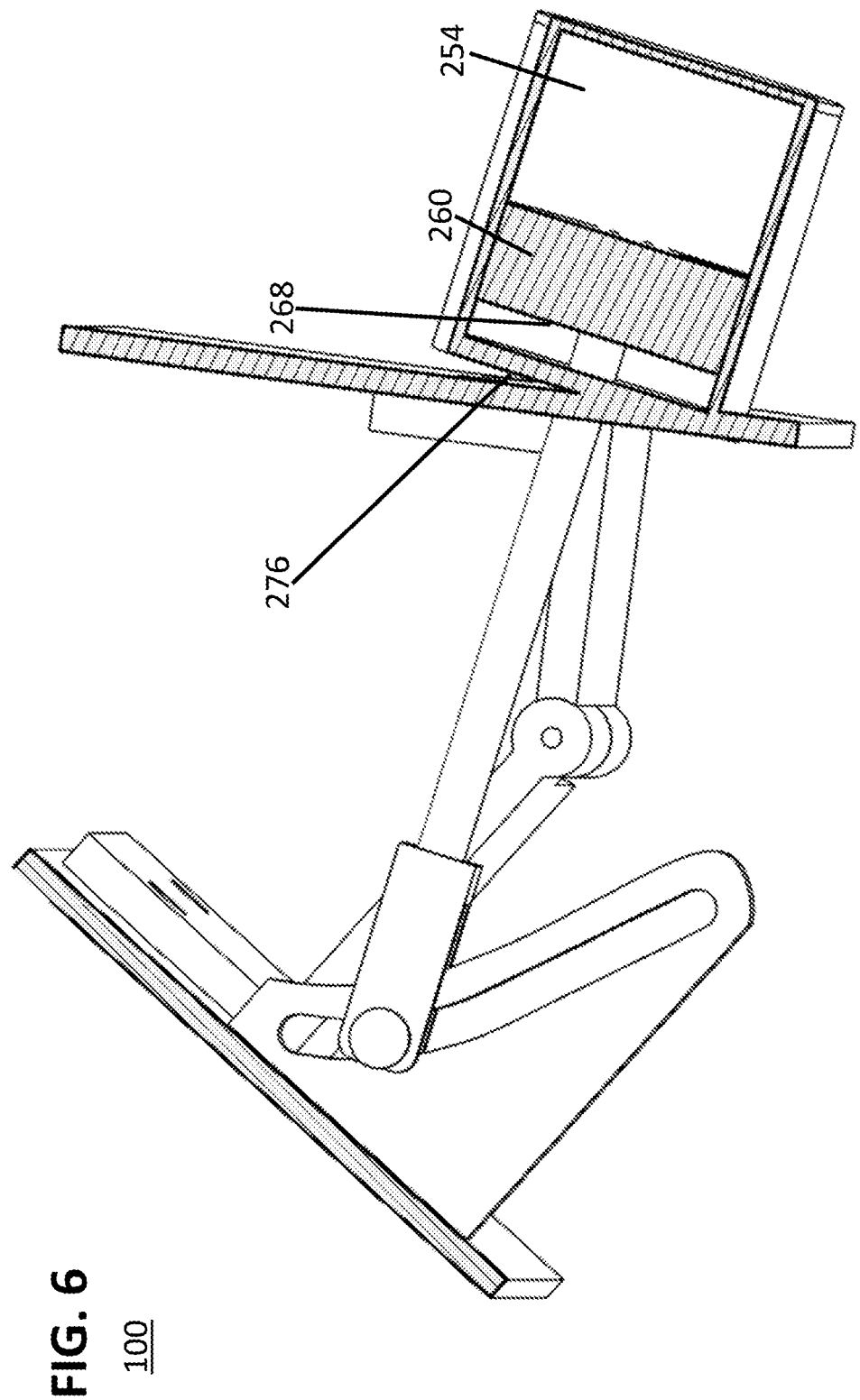
FIG. 6 shows the same open car door from FIG. 5 but the door is now partially closed and is at 54 degrees open.

FIG. 6 shows the same open car door from FIG. 5 but the door is now partially closed and is at 54 degrees open. Notice that the travel of the piston 260 relative to the rod end 276 of the hydraulic cylinder 254 as we will look at subsequent travel for 10 degrees of closing. As the piston 260 travels within the hydraulic cylinder 254, the distance of the hinge pin 114 from both the rod end 276 and the cap end 278 of the hydraulic cylinder 254 will change. The distances will be largest when the piston 260 is at the rod end 276 of the hydraulic cylinder 254 and will be smallest when the piston 260 is at the cap end 278 of the hydraulic cylinder 254.

Figure 7:
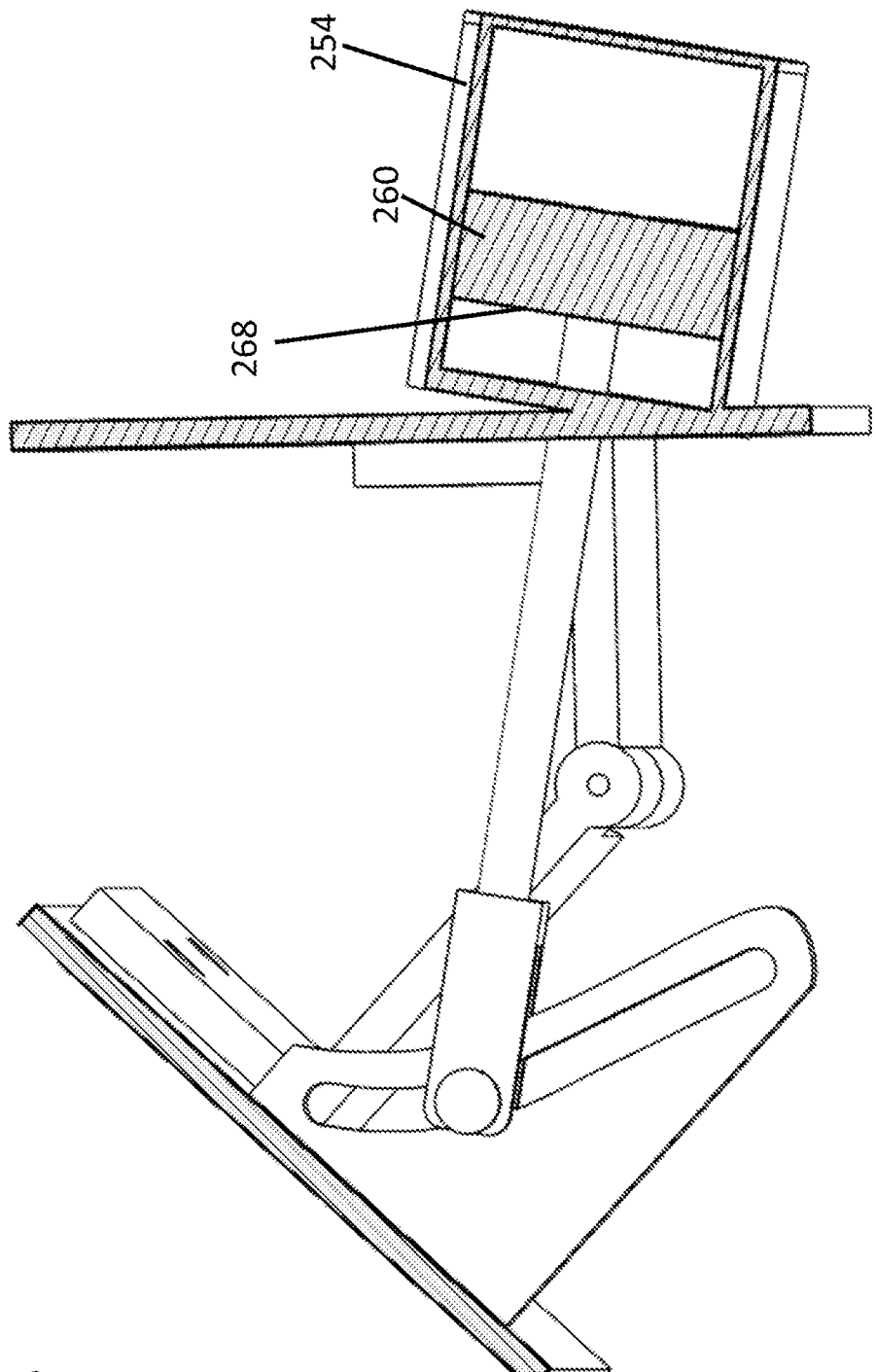
FIG. 7 shows the same open car door from FIG. 6 but the door is now further closed and is at 44 degrees open.

FIG. 7 shows the same open car door from FIG. 6 but the door is now further closed and is at 44 degrees open. The piston 260 has moved within hydraulic cylinder 254 relative to rod end 276 of the hydraulic cylinder 254 but less than in the previous 10 degrees of travel. While this is not a requirement of the teachings of the present disclosure, it can be desirable to decrease the resistance to closing from an initial level of resistance down to a final low level of resistance to balance a preference to prevent excessive door closing rates while not interfering with the final movement of the closing door into the fully closed position.

Figure 8:
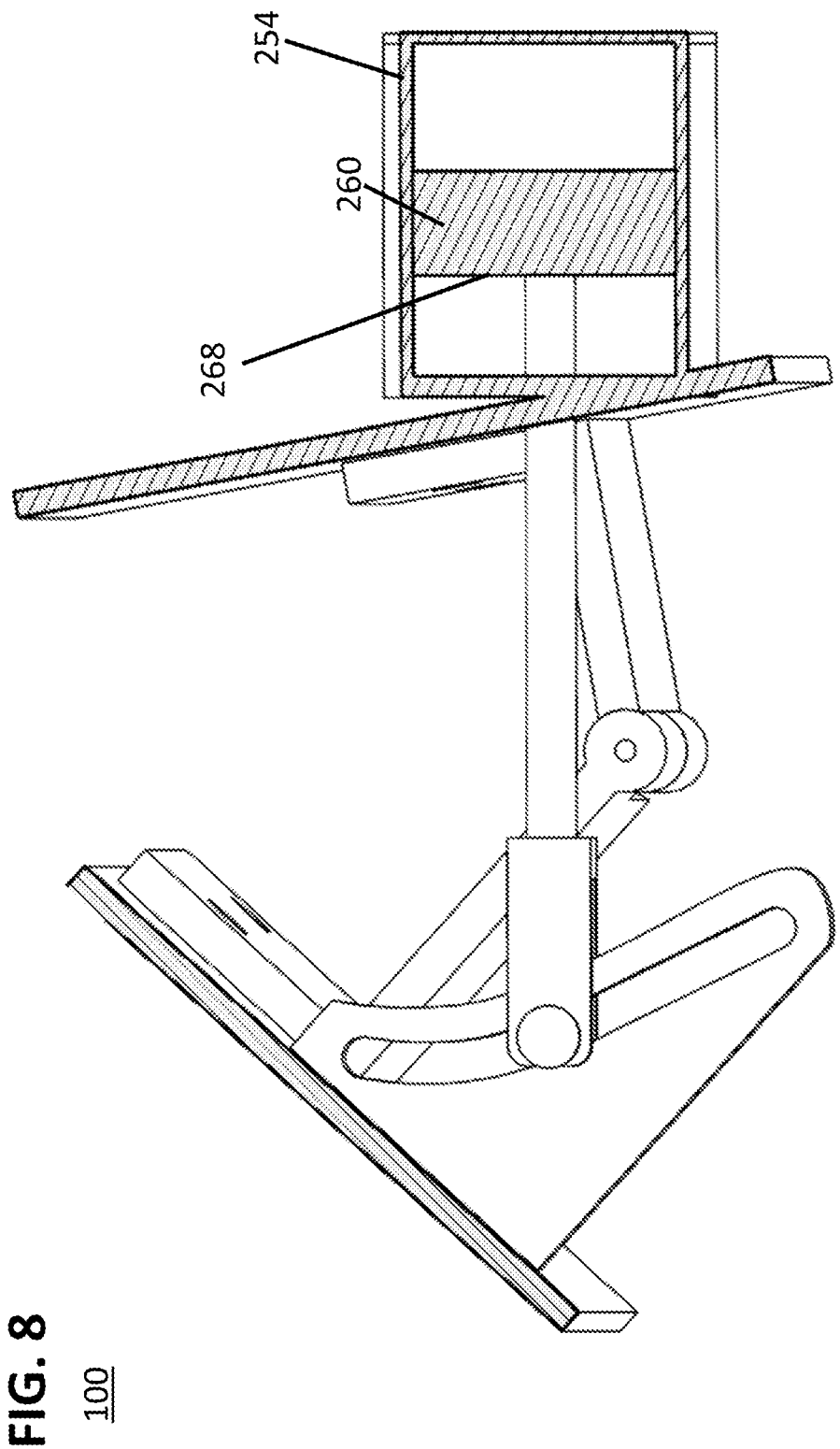
FIG. 8 shows the same open car door from FIG. 7 but the door is now further closed and is at 34 degrees open.

FIG. 8 shows the same open car door from FIG. 7 but the door is now further closed and is at 34 degrees open. The piston 260 has moved within hydraulic cylinder 254 relative to rod end 276 of the hydraulic cylinder 254 but less than in the previous 10 degrees of travel.

Figure 9:
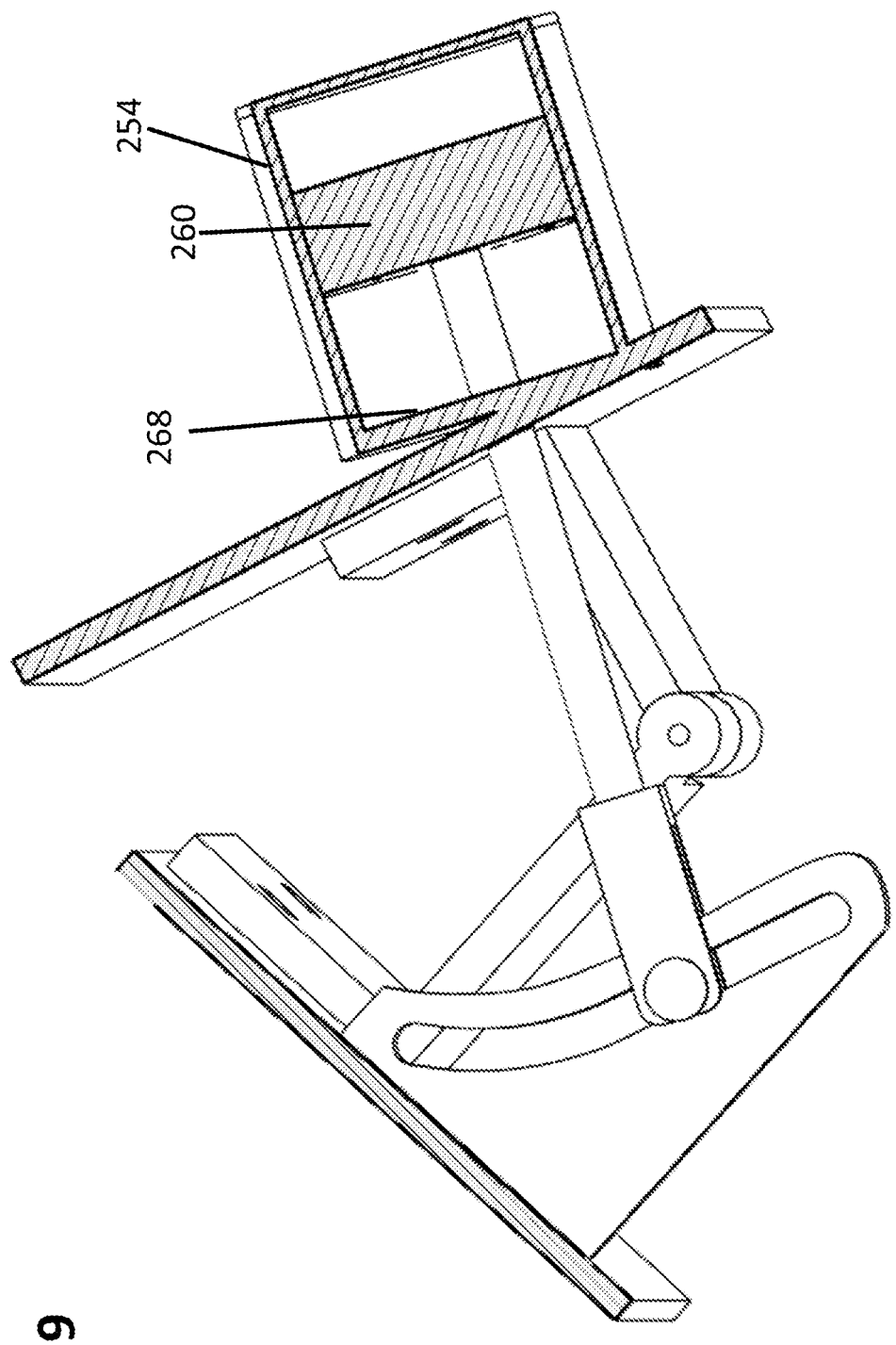
FIG. 9 shows the same open car door from FIG. 8 but the door is now further closed and is at 24 degrees open.

FIG. 9 shows the same open car door from FIG. 8 but the door is now further closed and is at 24 degrees open. The piston 260 has moved within hydraulic cylinder 254 relative to rod end 276 of the hydraulic cylinder 254 but less than in the previous 10 degrees of travel.

Figure 10:
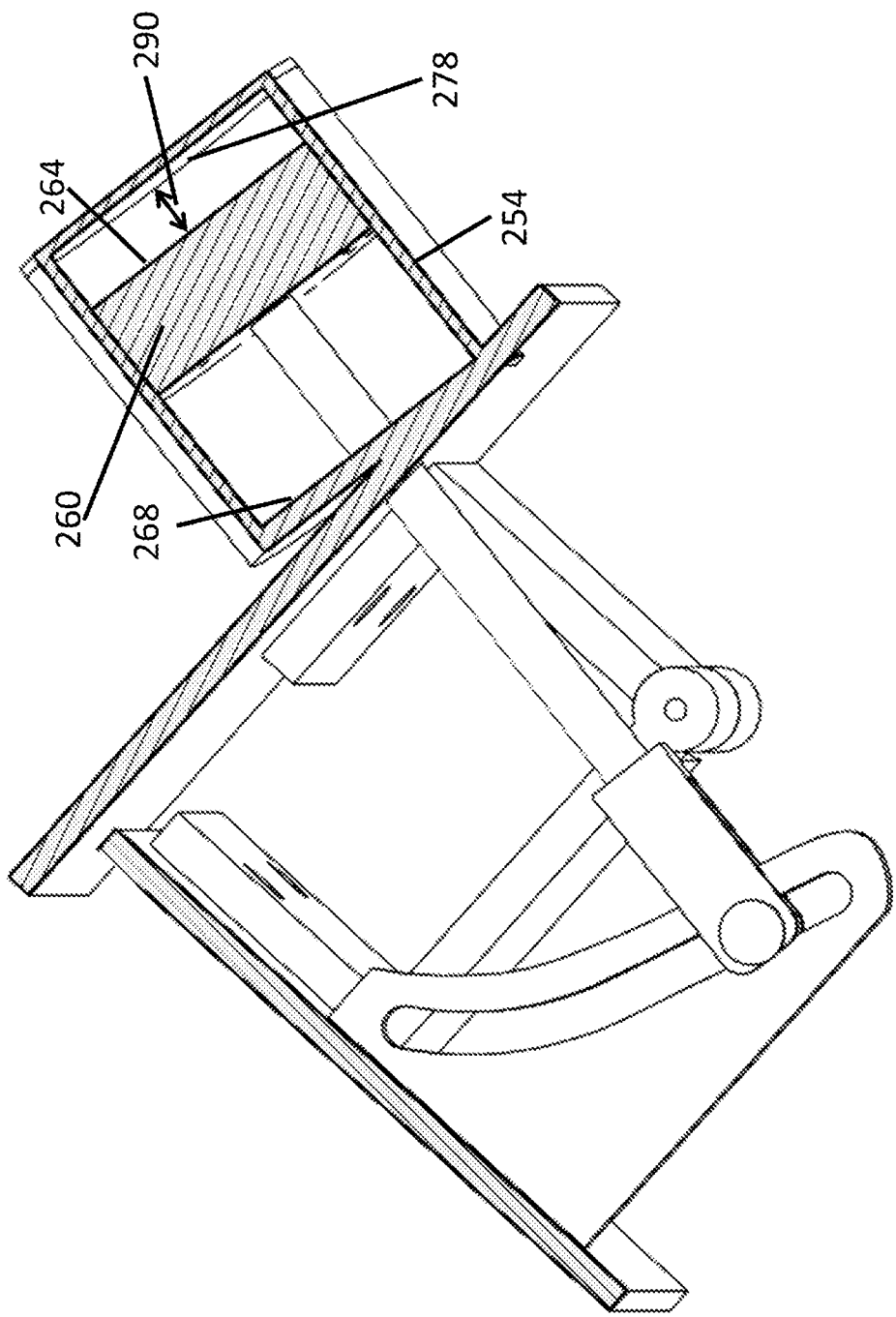
FIG. 10 shows the same open car door from FIG. 9 but the door is now fully closed and is at 0 degrees open.

FIG. 10 shows the same open car door from FIG. 9 but the door is now fully closed and is at 0 degrees open. The piston 260 has moved within hydraulic cylinder 254 relative to rod end 276 of the hydraulic cylinder 254 but with a lower amount of movement per degree of closing than in earlier portions of the door closing depicted in the prior figures. The distance 290 is the distance between the piston head 264 of the piston 260 and the inside of the cap end 278 of the hydraulic cylinder 254. In the example discussed in connection with Table 1, the minimum distance is 0.318 inches. By comparison, the thickness of the piston 260 is 0.5 inches in order to give the piston 260 ample strength for the task.

Varying Piston Movement Per Degree of Door Closure.

Optionally, the rate at which the piston 260 moves per degree closure of the door may be designed to vary over the closing cycle of the door through design of the force alignment channel 208. One design choice is to have the piston move more per degree of closing at the early stages of closing and end with relatively little movement of the piston per degree of closing at the final stages of closing. Table 1 provides an illustration of this variability. These measurements reflect piston locations before and after two-degree increments of movement from fully open at 64 degrees to fully closed at 0 degrees. More specifically, the distances are measured from the piston head 264 of the piston 260 to the inside of the cap end 278 of the hydraulic cylinder 254. Thus, maximum distance 280 (FIG. 5) of 1.055 inches is at the maximum amount when the door is full open at 64 degrees. As door rotates closed, the piston 260 moves towards the inside of the cap end 278 of the hydraulic cylinder 254, the distance decreases from the maximum distance 280 down to the final minimum distance 290 (FIG. 10) of only 0.318 inches. The change in distance from the maximum distance 280 to minimum distance 290 becomes smaller with successive equal sized increments of door rotation and thus the resistance to rapid movement of the door decreases as the door approaches fully closed.

Creating a New Actuator and Force Alignment Channel.

Figure 11:
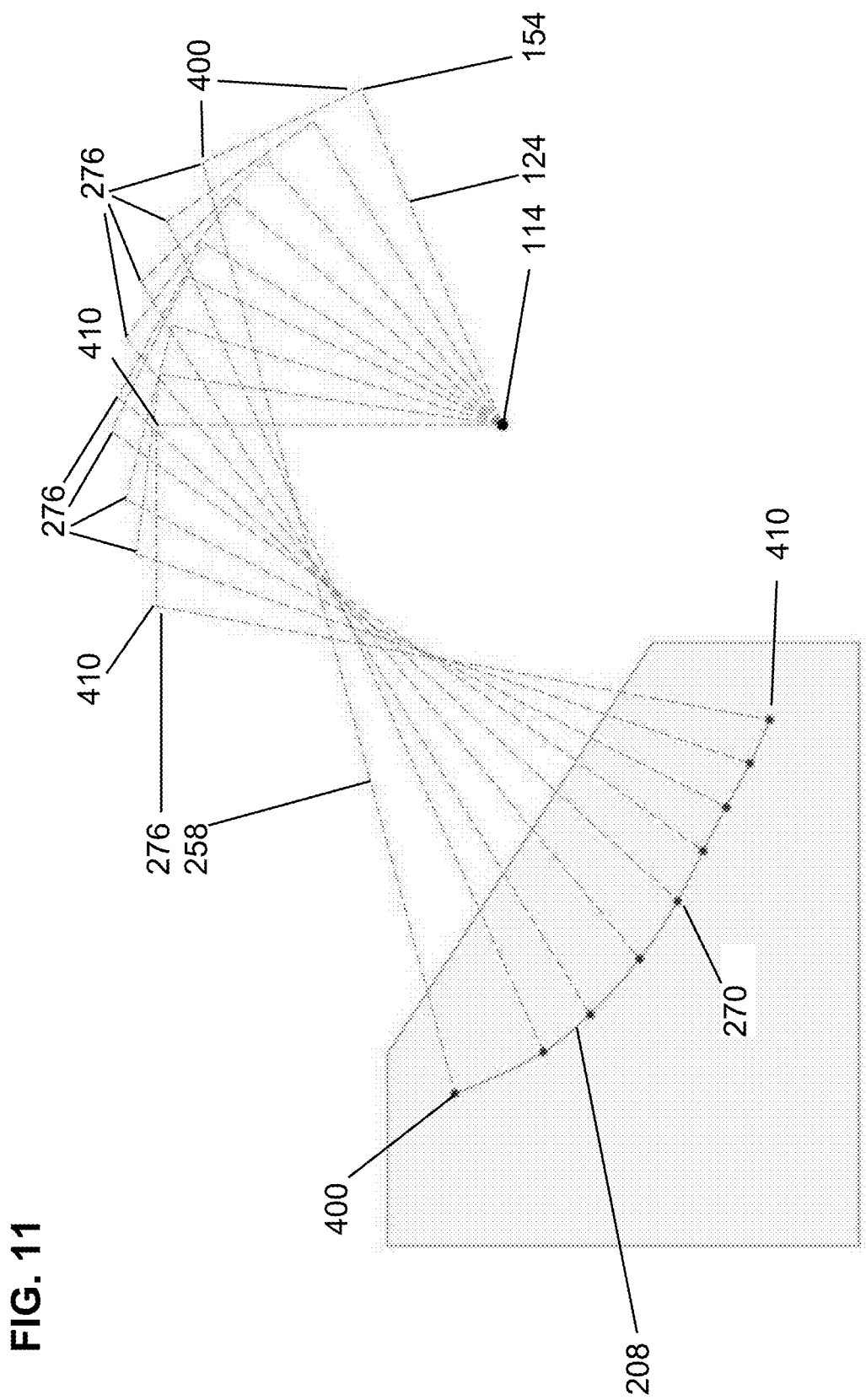
FIG. 11 helps illustrate the design process that leads to a first iteration of an actuator 204 and force alignment channel 208.

To assist in the use of the teachings of the present disclosure after patent rights are exhausted, FIG. 11 helps illustrate the design process that leads to a first iteration of an actuator 204 and force alignment channel 208. For a design effort for a car door, several things will be known. These include the range of pivot of the door from fully closed to fully open, the geometry of the hinge assembly 110 including the connections to the fixed pillar plate 104 and the door plate 154. This means that the distance 124 from the vertical hinge pin 114 to the door plate 154 (FIG. 5) is known. The geometry of the hydraulic cylinder 254 is known and will be based in part on what volume is available within the door to host the hydraulic cylinder 254.

The following reference points on FIG. 11 are identified:
Hinge Pin 114
Rod End 276 (FIG. 5) of the hydraulic cylinder 254
Piston Rod 258 but only up to the rod end 276 of the hydraulic cylinder 254
Centerline of Force Reflector Pin 270 at various points of the closing sequence
Fixed distance 124 from the hinge pin 114 to door plate 154

A careful observer will note that this geometry is similar but does not precisely match that found in FIG. 5 through FIG. 10. This was purposely done so that design lines and points 124, 154, 258, 268, 400, and 410 are easier to distinguish and differentiate.

With this geometry known, the two endpoints of the force alignment channel 208 are known. Fully open 400 and fully

TABLE 1

Piston Movement Per Two Degrees of Door Closing

| Start° | End° | Position Change per 2° | Piston started at. | Piston ended at. | Start° | End° | Position Change per 2° | Piston started at. | Piston ended at. |
|---|---|---|---|---|---|---|---|---|---|
| 64 | 62 | 0.035 | 1.055 | 1.02 | 32 | 30 | 0.03 | 0.537 | 0.507 |
| 62 | 60 | 0.035 | 1.02 | 0.985 | 30 | 28 | 0.025 | 0.507 | 0.482 |
| 60 | 58 | 0.034 | 0.985 | 0.951 | 28 | 26 | 0.023 | 0.482 | 0.459 |
| 58 | 56 | 0.034 | 0.951 | 0.917 | 26 | 24 | 0.02 | 0.459 | 0.439 |
| 56 | 54 | 0.033 | 0.917 | 0.884 | 24 | 22 | 0.018 | 0.439 | 0.421 |
| 54 | 52 | 0.033 | 0.884 | 0.851 | 22 | 20 | 0.016 | 0.421 | 0.405 |
| 52 | 50 | 0.033 | 0.851 | 0.818 | 20 | 18 | 0.014 | 0.405 | 0.391 |
| 50 | 48 | 0.032 | 0.818 | 0.786 | 18 | 16 | 0.012 | 0.391 | 0.379 |
| 48 | 46 | 0.032 | 0.786 | 0.754 | 16 | 14 | 0.011 | 0.379 | 0.368 |
| 46 | 44 | 0.032 | 0.754 | 0.722 | 14 | 12 | 0.01 | 0.368 | 0.358 |
| 44 | 42 | 0.032 | 0.722 | 0.69 | 12 | 10 | 0.009 | 0.358 | 0.349 |
| 42 | 40 | 0.031 | 0.69 | 0.659 | 10 | 8 | 0.008 | 0.349 | 0.341 |
| 40 | 38 | 0.031 | 0.659 | 0.628 | 8 | 6 | 0.007 | 0.341 | 0.334 |
| 38 | 36 | 0.031 | 0.628 | 0.597 | 6 | 4 | 0.006 | 0.334 | 0.328 |
| 36 | 34 | 0.03 | 0.597 | 0.567 | 4 | 2 | 0.005 | 0.328 | 0.323 |
| 34 | 32 | 0.03 | 0.567 | 0.537 | 2 | 0 | 0.005 | 0.323 | 0.318 |

An examination of Table 1 shows a dramatic decrease from an initial change of 0.035 inches per two degrees of closing dropping down to just 0.005 inches of piston movement per two degrees of closing. This is a seven to one change in movement per degree closure and thus a dramatic decrease in the force needed to move the hydraulic fluid through the bidirectional channel 310 in order to allow for movement of the piston 260. Most implementations will use O-rings or other mechanisms to prevent hydraulic fluid from passing along the perimeter of the piston 260. Thus all movement of hydraulic fluid will be through unidirectional channel 322, unidirectional channel 324, and unidirectional channel 326 or the bidirectional channel 310. Those of skill in the art will appreciate that there could be more than one bidirectional channel.

closed 410 are used repeatedly in FIG. 11 to allow a reader to see an array of positions associated with fully open or fully closed. A design choice to use the bulk of available piston travel within the hydraulic cylinder 254 in the first five increments of travel (0.20 inches of piston travel per ⅛th of the closing angle range) establishes a set of points on the force alignment channel 208 that identifies the shape of the force alignment channel for those initial five increments. Reducing the amount of travel of the piston 260 and thus the resistance to closing as the door approaches fully closed establishes the remaining four points on the force alignment channel 208, identifying the shape of the force alignment channel over the remaining four points.

Although FIG. 11 does not show the position of the piston 260 at each increment, the length of the piston rod 258 up to the rod end 276 of the hydraulic cylinder 254 reflects the position of the piston 260 within the hydraulic cylinder 254. Thus, the change in length of the piston rod 258 up to the rod end 276 of the hydraulic cylinder 254 from one increment to the next reflects the change of position of the piston 260 within the hydraulic cylinder 254 from one increment to the next.

There is not a requirement that nine points of equal closing amounts are required for use in this process. The process may use a different number of calculated points on the force alignment channel 208. It most instances, the designer will have the piston 260 move more per angle of door closing in the first portion of door closing and then will reduce the movement of the piston 260 per degree of door closing as the door approaches fully closed. Where the shift from more resistance to less resistance happens and whether the decrease in resistance is consistent throughout the door closing are matters of design choice and user preference. Using the teachings of the present application, a particular desire for a force resistance pattern, and the geometries of the various components, one can create a force alignment channel 208 for an actuator 204 to produce that force resistance pattern.

Preferred Materials.

One of skill in the art can select a low viscosity hydraulic fluid that will work well for the expected temperature ranges and the channel sizes that traverse the piston 260.

One suitable material for fabricating the piston 260 is a Delrin® acetal resin which is also known as acetal homopolymer material for the piston due to its strength and machinability.

Alternatives and Variations.

Force Alignment Channel on the Moving Door.

While the discussion above had the cylinder within the moving door and the actuator and force alignment channel affixed to the pillar, one of skill in the art will recognize that the positions would be switched with placement of the cylinder in the immobile pillar and the placement of the actuator and force alignment channel within the movable door. A system seeking to have one or more unidirectional flow channels in additional to one or more bidirectional flow channels would have check valves that allow free flow to the rod end 268 of the hydraulic cylinder 254 but impede or block flow to the cap end 278 of the hydraulic cylinder 254.

Relative Placement of the Actuator and Force Alignment Channel.

The actuator 204 may be on either side of the hinge 110 or between one end of the hinge pin 114 and the other end of the hinge pin 114. So for a substantially vertical hinge pin 114 that may be used for a door to allow a driver or passenger to enter into a car, the force alignment channel may be above the hinge 110, below the hinge 110, or between the top and bottom of the hinge 110.

Use on Doors Other than Traditional Automobile Passenger Doors.

The example discussed above had a hinge pin 144 that was substantially vertical for use in car doors to allow people in and out of the car. One of skill in the art will appreciate that the teachings of the present disclosure can be used for a hinge pin that is substantially horizontal such as for a rear door on a hatchback, or passenger doors that are gull-wing doors. One of skill in the art will appreciate that the hinge pin will be substantially vertical or substantially horizontal when the car is on a surface that is substantially level. If the car is on an incline, then the hinge pin will be rotated along with the car on the incline.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A limiter assembly for use during a closing of a car door, the car door having a connection that allows the car door to open from a fully closed position to a door angle in a fully open position that is rotated from the fully closed position; the limiter assembly comprising:
    an actuator with a force alignment channel; the actuator connected to a door pillar so that the actuator does not move during closing of the car door;
    a hydraulic cylinder located within the car door comprising:
        a piston that moves within the hydraulic cylinder during opening of the car door and during closing of the car door;
        a rod connected at a first end to the piston within the hydraulic cylinder;
        the rod extending out of a first end of the hydraulic cylinder and moving with respect to the first end of the hydraulic cylinder during opening of the car door and during closing of the car door;
        the rod slidably connected to the force alignment channel via a force reflector pin;
    the force alignment channel configured to keep the rod substantially perpendicular to a set of tangents of the force alignment channel taken at a current point of contact of the force reflector pin and the force alignment channel during closing of the car door; and
    the limiter assembly providing resistance to changes in the door angle proportional to a rate of change of position of the piston within the hydraulic cylinder per degree of change in the door angle of the car door moving towards fully closed.

2. The limiter assembly of claim 1 wherein the force reflector pin is encased in a sleeve that makes contact with the force alignment channel.

3. The limiter assembly of claim 1 wherein the force reflector pin makes contact with the force alignment channel.

4. The limiter assembly of claim 1 wherein
a first distance of travel of the piston for a first half of movement of the car door from the fully open position to the fully closed position exceeds
a second distance of travel of the piston for a second half of movement of the car door from the fully open position to the fully closed position
so that the resistance to changes in the door angle from the hydraulic cylinder is less on the second half of movement of the car door from the fully open position to the fully closed position than on the first half of movement of the car door from the fully open position to the fully closed position so as to promote complete closure of the car door.

5. The limiter assembly of claim 1 wherein the hydraulic cylinder has
at least one bidirectional channel that allows hydraulic fluid to pass from a rod side of the hydraulic cylinder to a cap end of the hydraulic cylinder and allows hydraulic fluid to pass from the cap end of the hydraulic cylinder to the rod side of the hydraulic cylinder; and
at least one unidirectional channel that allows hydraulic fluid to pass from the rod side of the hydraulic cylinder to the cap end of the hydraulic cylinder but does not freely allow hydraulic fluid to pass from the cap end of the hydraulic cylinder to the rod side of the hydraulic cylinder as a check valve impedes movement in one direction; and
whereby the resistance to movement of the piston within the hydraulic cylinder is less when the car door moves to the fully open position from the fully closed position than the resistance to movement of the piston when the hydraulic cylinder moves from the fully open position to the fully closed position.

6. The limiter assembly of claim 5 wherein at least one bidirectional channel traverses the piston from a rod side of the hydraulic cylinder to the cap end of the hydraulic cylinder.

7. The limiter assembly of claim 5 wherein at least one unidirectional channel traverses the piston from a rod side of the hydraulic cylinder to the cap end of the hydraulic cylinder.

8. The limiter assembly of claim 1 wherein the car door rotates around a hinge pin and the hinge pin is substantially vertical when a car with the car door is on a level foundation.

9. The limiter assembly of claim 1 wherein the car door rotates around a hinge pin and the hinge pin is substantially horizontal when a car with the car door is on a level foundation.

10. A limiter assembly for use during a closing of a car door, the car door having a connection that allows the car door to open from a fully closed position to a door angle in a fully open position that is rotated from the fully closed position; the limiter assembly comprising:
a hinge connecting a set of two door hinge sides comprising:
  a pillar side that does not move when the car door moves from fully open to fully closed;
  a car door side of the hinge that does move when the car door moves from fully open to fully closed
an actuator with a force alignment channel; the actuator connected to one of the two door hinge sides;
a hydraulic cylinder located within the other of the two door hinge sides:
a piston that moves within the hydraulic cylinder during opening of the car door and during closing of the car door;
a rod connected at a first end to the piston within the hydraulic cylinder;
the rod extending out of a first end of the hydraulic cylinder and moving with respect to the first end of the hydraulic cylinder and a second cap end opposite of the first end during opening of the car door and during closing of the car door;
the rod slidably connected to the force alignment channel via a force reflector pin;
the force alignment channel configured to keep the rod substantially perpendicular to a set of tangents of the force alignment channel taken at a current point of contact of the force reflector pin and the force alignment channel during closing of the car door; and
the limiter assembly providing resistance to changes in the door angle proportional to a rate of change of position of the piston within the hydraulic cylinder per degree of change in the door angle of the car door moving towards fully closed.

11. The limiter assembly of claim 10 wherein the hydraulic cylinder has at set of at least one check valve to reduce a resistance of the hydraulic cylinder to movement of the piston during opening of the connected car door relative to the resistance of the hydraulic cylinder to movement of the piston during closing of the connected car door.

12. The limiter assembly of claim 10 wherein the force reflector pin is encased in a sleeve that makes contact with the force alignment channel.

13. The limiter assembly of claim 10 wherein the force reflector pin makes contact with the force alignment channel.

14. The limiter assembly of claim 10 wherein at least one bidirectional channel traverses the piston from a rod side of the hydraulic cylinder to the cap end of the hydraulic cylinder.

15. The limiter assembly of claim 10 wherein at least one unidirectional channel traverses the piston from a rod side of the hydraulic cylinder to the cap end of the hydraulic cylinder.

16. The limiter assembly of claim 10 wherein the car door rotates around a hinge pin and the hinge pin is substantially vertical when a car with the car door is on a level foundation.

17. The limiter assembly of claim 10 wherein the car door rotates around a hinge pin and the hinge pin is substantially horizontal when a car with the car door is on a level foundation.

18. A method of opening and closing a car door comprising:
opening a car door having a first side of a door hinge and a second side of a door hinge; wherein opening the car door from a fully closed position to a fully open position includes moving a piston within a hydraulic cylinder as one end of a rod is connected to the first side of the door hinge and another end of the rod is connected to the piston within the hydraulic cylinder on the second side of the door hinge; and
closing the car door against the resistance of the hydraulic cylinder as hydraulic fluid moves through at least one channel to allow hydraulic fluid to move from a first side of the piston to a second side of a piston; the resistance of the hydraulic cylinder to an incremental movement in the car door varying during the closing of the car door; and
a shape of a force alignment channel within an actuator on the first side of the door hinge creating a pattern of variation of the resistance of the hydraulic cylinder to the incremental movement in the car door as the shape of the force alignment channel varies a rate of movement of the piston within the hydraulic cylinder per degree of closure of the car door.

19. The method of opening and closing the car door of claim 18 including at least one unidirectional channel for a movement of hydraulic fluid from a first side of the piston to a second side of the piston so that the unidirectional channel reduces the resistance of the hydraulic cylinder against moving the car door from the fully closed position to the fully open position relative to the resistance of the hydraulic cylinder against moving the car door from the fully open position to the fully closed position.

20. The method of opening and closing the car door of claim 18 wherein the first side of the door hinge is on a door pillar and does not move while moving the car door from the fully closed position to the fully open position.

21. The method of opening and closing the car door of claim 18 wherein the second side of the door hinge is on a door pillar and does not move while moving the car door from the fully closed position to the fully open position.

22. The method of opening and closing the car door of claim 18 wherein the car door rotates around a hinge pin and the hinge pin is substantially vertical when the car is on a level foundation.

23. The method of opening and closing the car door of claim 18 wherein the car door rotates around a hinge pin and the hinge pin is substantially horizontal when the car is on a level foundation.

\* \* \* \* \*